(12) United States Patent
Nann et al.

(10) Patent No.: US 6,376,119 B1
(45) Date of Patent: Apr. 23, 2002

(54) PLUG SYSTEM FOR CAPPING CELL VENTS IN A STORAGE BATTERY AND A BATTERY CAP FOR USE IN THE PLUG SYSTEM

(75) Inventors: Eberhard Nann, Soest-Deiringsen; Ulrich Wulf, Soest, both of (DE)

(73) Assignees: Accumulatorenwerke Hoppecke Carl Zoellner; Sohn GmbH & Co. KG (DE)

( * ) Notice: Subject to any disclaimer, the term of this patent is extended or adjusted under 35 U.S.C. 154(b) by 0 days.

(21) Appl. No.: 09/189,709

(22) Filed: Nov. 11, 1998

(30) Foreign Application Priority Data

Nov. 19, 1997 (DE) .......................................... 197 51 136

(51) Int. Cl.[7] ................................................. H01M 2/12
(52) U.S. Cl. ............................... 429/54; 429/86; 429/89
(58) Field of Search ............................... 429/86, 89, 54

(56) References Cited

U.S. PATENT DOCUMENTS 1,765,027 A * 6/1930 Mitchell ...................... 429/54
6,235,419 B1 * 5/2001 Marukawa et al. ......... 429/54 X

FOREIGN PATENT DOCUMENTS

| CH | 658 940 A5 | 12/1986 |
| DE | 42 26 809 A1 | 8/1992 |
| DE | 195 27 526 A1 | 7/1995 |
| EP | 0 305 822 A1 | 3/1989 |
| EP | 0 504 573 A1 | 9/1992 |
| EP | 0 554 535 A1 | 8/1993 |
| EP | 0 570 703 A1 | 11/1993 |
| EP | 0 584 528 A1 | 3/1994 |
| EP | 0 756 338 A1 | 1/1997 |
| EP | 0 920 063 A1 | 6/1999 |
| JP | A 62 122054 | 11/1987 |
| JP | A 62-232853 | 4/1988 |
| JP | A4-132163 | 8/1992 |

* cited by examiner

*Primary Examiner*—John S. Maples
(74) *Attorney, Agent, or Firm*—Cantor Colburn LLP

(57) ABSTRACT

This invention concerns a plug system for capping cell vents (26, 27) of a storage battery, consisting of a plug body (1) that can be inserted in a cell vent (26, 27), holding a plug (2) and a valve element (3), thus providing a normally closed fluidic connection between the inside (30) of the cell and the atmosphere surrounding the storage battery.

29 Claims, 4 Drawing Sheets

PLUG SYSTEM FOR CAPPING CELL VENTS IN A STORAGE BATTERY AND A BATTERY CAP FOR USE IN THE PLUG SYSTEM

This invention concerns a plug system for closing cell vents in a storage battery and a battery cap for use in the plug system.

Storage batteries consist of two chemically different electrodes that are arranged in a case with a cap in a mostly fluid or concentrated electrolyte. In the lead batteries generally used in motor vehicles, the electrodes are made of lead and are designed to be grid-shaped. The grid mesh are filled with lead dioxide $PbO_2$ on the positive side and with so-called spongy lead, finely dispersed porous lead, on the negative side. Sulfuric acid $H_2SO_4$ is generally used as the electrolyte. In lead batteries, especially for motor vehicles, several cells are connected in a row. One side of the first cell and one side of the last cell has a contact pole that projects through the cap on the case. During the charging processes, chemical reactions take place that cause gas to be formed. Most storage batteries have gas outlet vents in their caps.

To prevent and reduce electrolyte evaporation, on one hand, and to be able to send the gases formed when the storage battery is overcharged outside into the air surrounding the battery before a critical excess pressure is reached inside the cells, the individual cells of a storage battery are generally closed by means of plugs designed as excess pressure valves. To prevent the batteries from exploding, two basic ways of degassing are known for removing the easily combustible gases created. One is to let off the gas directly via plugs that cap the individual cell vents, another is via a central gas line in which the individual cell vents are connected to one another via a transverse bore hole in the cap of the storage battery case. In the last degassing variation, the cell vents in the battery case above the channel made by the transverse vent are capped, are gas-tight and generally come out in the front of the case. In both ways of removing gas, the gases pass through a porous filter disk, a so-called frit, before leaving the battery, especially to prevent backfires inside the battery and the damage associated with them.

This invention is based on the problem of providing a plug system for capping the cell vents of a storage battery that consists of the fewest possible simple elements, with a combination of individual elements that can be adjusted to different battery designs, that can be adapted to meet the needs of individual batteries and that meet the requirements set for the main degassing variations, especially in terms of backfire protection and sealing. The plug system in the invention should also be very economical in terms of production, assembly and storage.

To solve this problem, this invention has proposed a plug system for capping the cell vents of a storage battery that consists of a plug body that can be used in a cell vent which holds a valve element and a plug, providing a normally closed, fluidic connection between the inside of the cells and the atmosphere surrounding the storage battery.

The plug system in the invention thus basically consists of three simple basic elements that bring with them low production, assembly and storage costs and a low expense in providing the corresponding technical manufacturing equipment and have no problem meeting the requirements for various storage battery designs and degassing variations.

In one advantageous embodiment of the invention, the plug body has at least one section that is reduced compared to the outer diameter of the plug body. This makes a basically annular projection on one end of the generating surface of the plug body which provides a basically annular stop surface lying on the outer front surface surrounding the cell vent of the storage battery cap and makes possible, for example, simple, precise insertion of the plug body into the cell vent. Advantageously, the storage battery cap has a negatively formed receptacle corresponding to the annular projection of the plug body which provides at least one front surface corresponding to the annular stop surface formed by the projection. The basically annular projection of the plug body can be used to attach the plug body in the cell vent. For this, the projection can have an attachment element on the outside, for example, or in the area of the projection in the cell vent that is glued, soldered or otherwise connected to the cap. Advantageously, the plug body can be inserted tightly, especially gas-tight in the cell vent. For this, the plug body has at least one sealing element, preferably an O-ring. According to one particularly advantageous embodiment of the invention, the sealing element is molded on the plug body and is, for example, a sealing ring injection-molded onto the plug body, and it can then be produced in a two-component process. Advantageously, the sealing element is arranged in an area of the plug body next to the annular projection. This guarantees that the plug body can be inserted safely into the cell vent and is gas-tight. Likewise, the annular projection of the plug body can have an area that at least partially holds the sealing element. Moreover, the projection can be designed to be conical, so that there is a guide when the plug body is inserted into the cell vent that can prevent it from being inserted incorrectly.

In another especially advantageous embodiment of the invention, the plug body has at least one section in the middle that is reduced compared to the outer diameter of the plug body, with at least one vent. Advantageously, the sections that are enlarged compared to the middle of the plug body are designed to be annular, so that a space is formed when the plug body is inserted between the middle, reduced section of the plug body and the battery case cap that provides a fluidic connection to the inside of the cells through at least one vent in the reduced section. Advantageously, the space formed by the reduced section in the middle part of the plug body and the battery case cap when the plug body is inserted is gas-tight. Advantageously, the sections connected to the reduced section in the middle of the plug body have a sealing element, preferably a molded O-ring.

In another advantageous embodiment of the invention, the plug body has an attachment element on the end facing the inside of the cells, with which the plug body can be attached in the cap. For this, the plug body has, for example, at least one projection that grasps behind the cap on the end. With the projection, the plug body is fixed when inserted in the cap and can no longer be removed from it. Advantageously, the plug body is held fast when inserted by pressing it into the cap. In this way, the plug body is securely attached, for one thing, and, for another, the most gas-tight insertion is made possible. In another especially advantageous embodiment of the invention, the plug body has a thread on at least one of the sections of the plug body next to the reduced section that matches a corresponding thread provided in the cap.

According to another advantageous embodiment of the invention, the plug body has a section inside to hold the valve element. In this way, the valve element can be placed in the plug body extremely simply with no problem. Advantageously, the section for holding the valve element is next to at least one vent in the generating surface of the plug body, so that the valve element normally caps the fluidic connection between the space formed by the reduced section of the plug body and the cap and the inside of the cell. Moreover, the vent in the generating surface of the plug body cannot be capped accidentally by the valve element. Advantageously, the section for the valve element forms a step on which the valve element can be mounted. In another advantageous embodiment of the invention, the generating surface of the section holding the valve element is designed to be slightly conical, so that the valve element can be fixed in the plug body by slight press-fitting. Likewise, it is possible for the valve element to have slightly conical outer walls, which make slight press-fitting possible in the area of the section provided for holding it inside the plug body. In another advantageous embodiment of the invention, the plug body in the area of the section has at least one projection for fixing the valve element in that area. Preferably, this projection is designed to be annular.

In another advantageous embodiment of the invention, the plug body has at least one intermediate wall inside forming a baffle plate which is preferably in a section next to the valve element toward the inside of the cells. The intermediate wall forming a baffle plate forces gas flowing from inside the cells to change direction and holds back the entrained fluid to protect the sealing element, for example, a rubber membrane on the valve element. The gas flowing out can then precipitate on the intermediate wall, and thus particles of fluid can condense on the wall and flow back inside the cells.

According to another advantageous embodiment of the invention, the plug has a vent. This creates the possibility of degassing through the cell cap. Advantageously, the vent is arranged in the middle of the plug.

In another advantageous embodiment of the invention, the plug can be snapped into the plug body. This guarantees that the plug, especially in the area near the cell vent, closes flush with the plug body. Advantageously, the plug can be inserted tightly into the plug body. This guarantees that a fluidic connection can be made only by the vents provided for it. Advantageously, the plug can be attached in the plug body. For this, the plug can be attached, for one thing, with an attachment element, for example with a thread corresponding to the plug body or by gluing, welding, for example ultrasonic welding, or the like. The plug is fixed in the plug body by means of press fitting in an advantageous way. This seals the plug in the plug body and makes attachment extremely simple.

According to another especially advantageous embodiment of the invention, the plug has a section inside to hold a filter disk. Advantageously, the plug has at least one projection to attach the filter disk in the receptacle provided for it, which is preferably designed to be annular and holds the back of the filter disk when in use.

In another especially advantageous embodiment of the invention, the vent in the generating surface of the plug body can be inserted in the plug body to close it. With only one plug body, this allows both central degassing through a transverse channel provided in the storage battery cap and degassing through the respective cell cap.

In another advantageous embodiment of the invention, with a plug with an eccentric vent and a plug body with a reduced central section with vent, both central degassing and degassing through the cell cap, hence the plugs, can be achieved by different positions for inserting the plug into the plug body. Thus, in the first position, for example, the vent in the surface of the plug body is capped by the plug and in the second position, the vent in the plug is capped by the plug body.

Advantageously, the valve element used in the plug body is an excess-pressure valve, so that a normally closed valve is provided that only opens when there is a certain pressure inside the cell. Advantageously, the valve vent is proportional to the excess pressure inside the cell.

Moreover, with this invention, a storage battery cap is proposed for use in the plug system in the invention that is characterized, for backfire-safe degassing, by an insert that can be used in the storage battery cap and provides a fluidic connection between the inside of the cell and the atmosphere surrounding the storage battery that allows degassing in front. Advantageously, the insert forms a tunnel-shaped channel and has at least one receptacle for a filter element. The filter disk can retain particles of fluid in the gas and, due to the design of the channel, which advantageously runs basically perpendicular to a central degassing channel in the battery cap, the gas flow is subjected to changes in direction. Due to the funnel-shaped route, the space for the gas in the direction of the degassing vent keeps being reduced, so that the gas flowing out and precipitating on the walls of the funnel can further condense and flow back inside the cells.

According to another advantageous embodiment of the invention, the filter element can be arranged directly next to the space formed by a plug body and the storage battery cap, so that flames from backfires cannot get inside the storage battery. Advantageously, the filter disk of the insert is the same size as the filter disk in the plug system.

According to another advantageous embodiment of the invention, the insert can be used as a seal in the storage battery cap. For this, it can be snapped, glued, welded, screwed or otherwise attached, for example, in the storage battery cap.

According to another especially advantageous embodiment of the invention, the plug system in the invention is used for the insert. For one thing, this further increases the possibilities of using the plug system, and, for another, it also makes front degassing possible with the same plug system and with a small number of components, in addition to capping the cell vents of a storage battery.

According to another particularly advantageous embodiment of the invention, the storage battery cap in the area near the cell vents has cam-like projections that make it possible to seal the cell vents axially. This design for the cell vents of the storage battery cap can provide a safe seal both radially and axially using a plug body that has with sealing elements. This further enhances the seal on the storage battery. The design for the cell vents of a storage battery cap with cam-like projections can also be used advantageously without the plug system in the invention and made with other battery caps or inserts.

Other advantages and features of the invention will be explained in greater detail using the examples of embodiment shown in the figures.

BRIEF DESCRIPTION OF THE DRAWINGS

FIG. 1b shows a top view according to FIG. 1a;

FIG. 2b shows a top view according to FIG. 2a;

FIG. 1a shows a sectioned view of a plug body 1 that can be used in a cell vent, in which a plug 2 and a valve element 3 are arranged. The plug body 1 is basically made of a round cylinder, which has a reduced section 5 in the middle part 4 compared to the outer diameter D of the plug body with a vent 6. With the reduced section 5, sections 7 and 8, forming a round projection, are made on the ends of the plug body 1; section 8 has an outer diameter d that is enlarged compared to the reduced section 5 but reduced compared to the outer diameter D of the plug body.

Figure 1A:
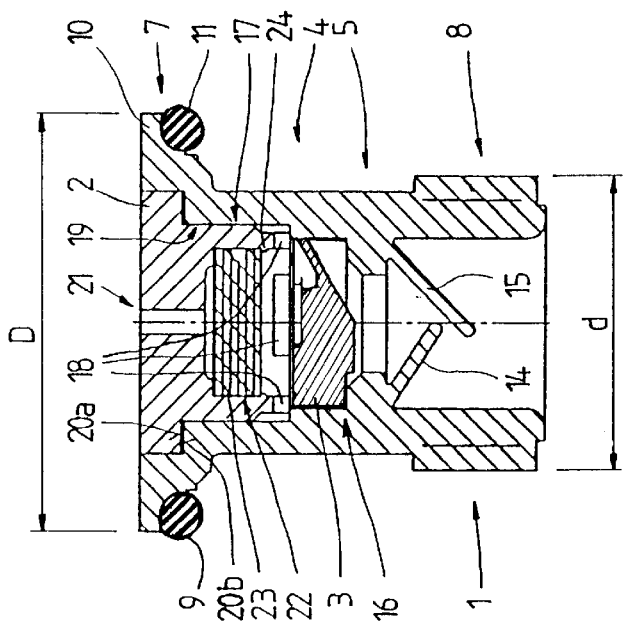
FIG. 1a shows a sectioned view of an example of embodiment of the plug system in the invention.

Section 7 provides a projection 10 forming a round stop surface 9 that goes on the outer front surface surrounding the cell vent of a storage battery case. In this case, the round projection 10 has a sealing element 11 near the stop surface 9 which is formed here by a molded O-ring.

In the area near the transition from the reduced section 5 to section 8 pointing toward the inside of the cell, the plug body 1 has another sealing element 12, which is molded on plug body 1 here in a receptacle 13 provided in the plug body 1.

Inside, the plug body 1 has two intermediate walls 14 and 15 forming a baffle plate near the transition from section 5 to section 8, which force gases flowing from the inside of the cell to change direction and retain electrolyte fluid entrained with them.

In reduced section 5, the plug body 1 has a section 16 inside to hold a valve element 3 designed as an excess-pressure valve, which is arranged so that the valve element 3 is next to vent 6 in section 5 when in use. In the area near the transition from section 5 to section 8, the plug body 1 is designed inside so it tapers like a funnel through several sections next to the valve element 3. Above the valve element 3, the plug body 1 has a widened section 17 compared to section 16, which has projections 18 arranged radially to secure the valve element 3 in the receptacle 16 of the plug body 1.

In the plug body 1, in area 7, the plug 2 is inserted so it closes flush with the plug body 1, and the plug 2 has a section 19 reduced compared to its outer diameter, which corresponds in its outer diameter to the inner diameter of section 17 of the plug body 1. Through reduced section 19, the plug 2 in the area near section 7 of the plug body 1 forms a round stop or supporting surface 20a or 20b. The plug 2 in the area near its section 19 in section 17 of the plug body 1 is pressed into it so it is gas-tight. In addition, the plug 2, in the area of its supporting surface 20a with the plug body 1 in the area of section 7 can be welded to it. As can be seen in FIG. 1b, the plug body 1 has a circular cross section, while the plug 2 has a cross section that is basically oval or lemon-shaped.

Figure 1B:
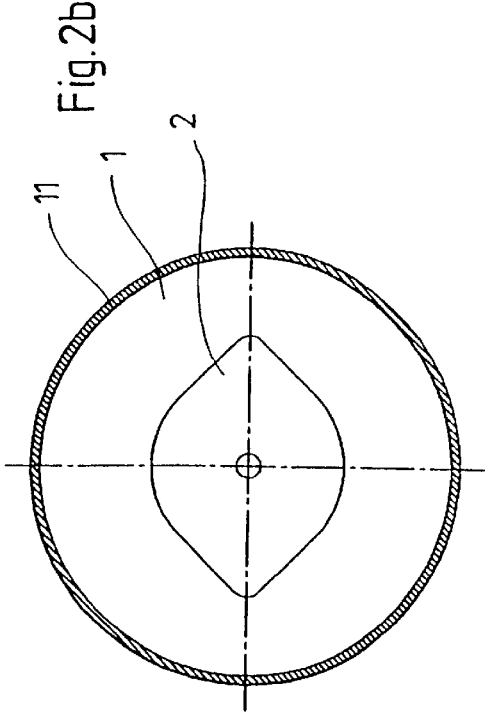
Figure 5:
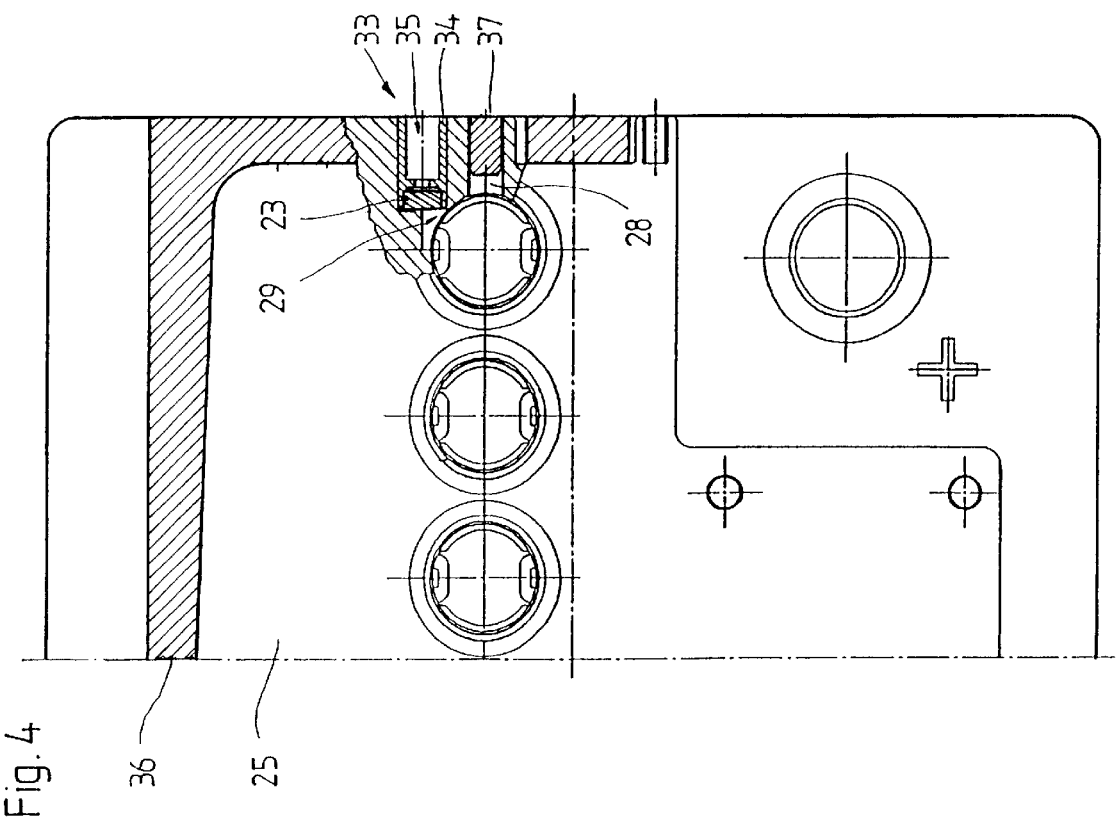
FIG. 5 shows a partially sectioned top view of an example of embodiment of a storage battery with an embodiment of a plug system as in FIGS. 1a, 1b and 3.

The plug system shown in FIGS. 1a and 1b to cap cell vents of a storage battery offers the possibility of central gas conductance through a transverse bore hole connecting the cell vents in the cap to one another, and a fluidic connection is provided between the space surrounding section 5 and the cell inside via the vent 6 in the plug body 1, the valve element 3 and the section holding the intermediate walls 14 and 15 inside the plug body 1, as explained in greater detail below in connection with FIG. 5.

Figure 2A:
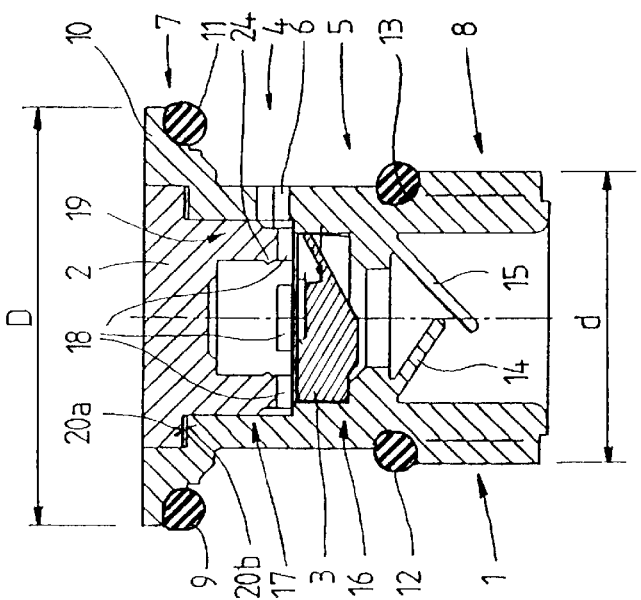
FIG. 2a shows another sectioned view of an example of embodiment of the plug system in the invention.
Figure 2B:
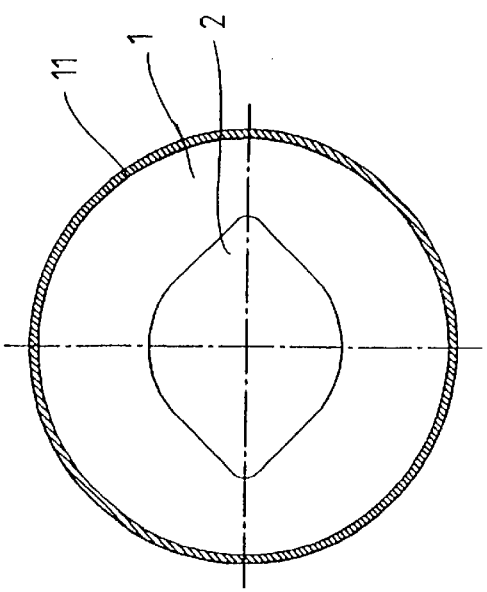

FIGS. 2a and 2b show another example of embodiment of a plug system to cap cell vents in a storage battery. FIG. 2a also shows a basically cylinder-shaped plug body 1 that can be used in a cell vent and holds a plug 2 and a valve element 3 that provides a normally closed fluidic connection between the inside of the cell and the atmosphere surrounding the storage battery. In contrast to the plug body 1 shown in FIGS. 1a and 1b, the plug body 1 shown in FIGS. 2a and 2b has no vent 6 in its reduced section 5. Moreover, the plug body 1 shown in FIGS. 2a and 2b has, only in the area of section 7, a molded sealing element 11 in the area near the round stop surface 9 for gas-tight insertion into a cell vent. The plug 2 in the plug system in FIGS. 2a and 2b has a vent in the center, which provides a fluidic connection between the inside of the cell and the atmosphere surrounding the storage battery.

The plug 2 has a section 22 inside next to the vent 21, which in this case takes a filter disk 23. The plug 2 has a round projection 24 connecting section 22, which is used to attach the filter disk 23 in the plug 2. In this way, the filter disk 23 can be arranged extremely simply in plug body 2 before plug 2 is mounted in plug body 1 so it is safe from loss and gas-tight.

Figure 3:
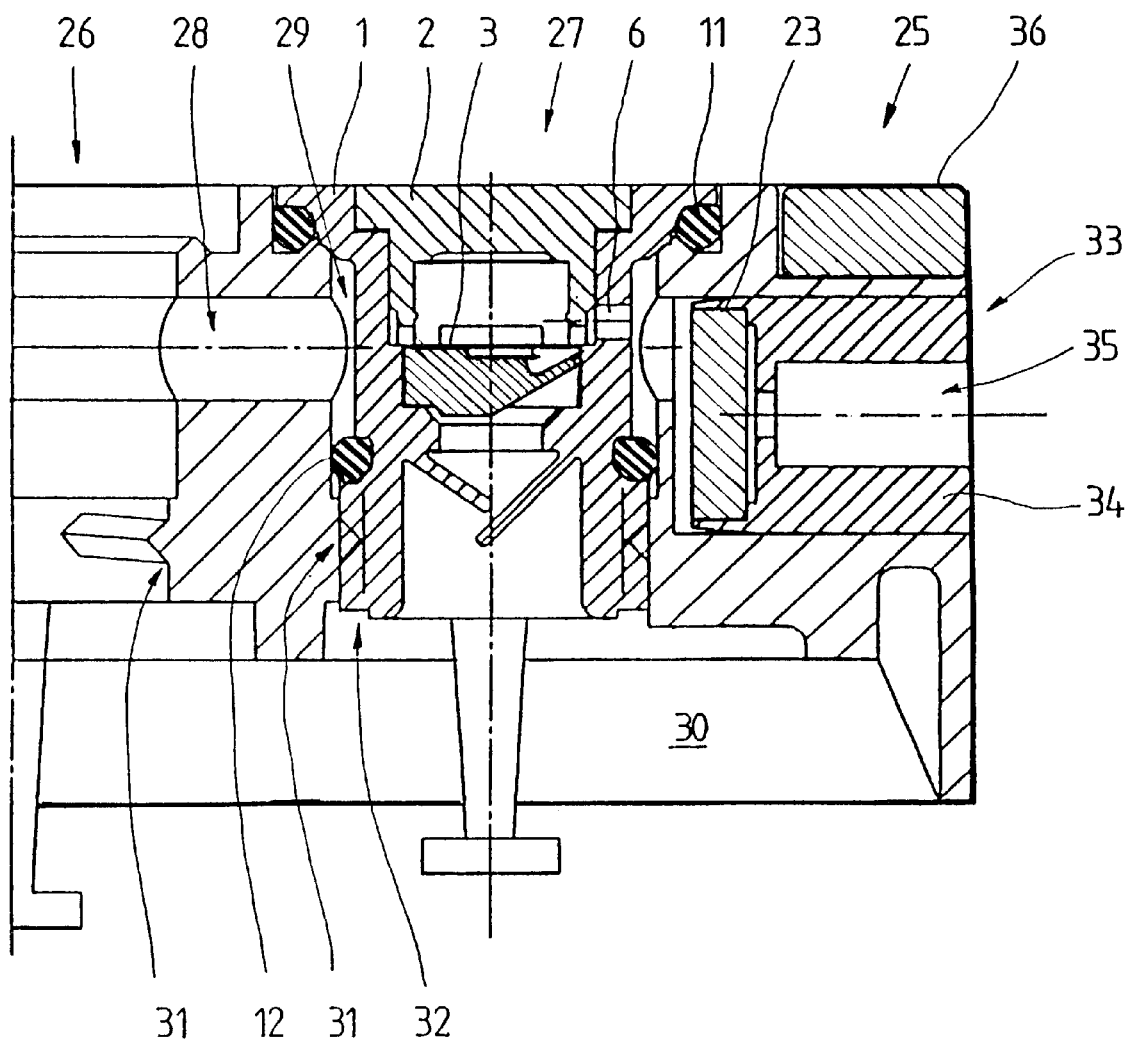
FIG. 3 shows a sectioned view through the cap of a storage battery with the plug system in FIG. 1a inserted.

FIG. 3 shows a sectional view of a cutout of the storage battery cap 25 with an open cell vent 26, partially shown, and a cell vent 27 capped with a plug system according to FIGS. 1a and 1b. The storage battery cap has a channel 28 fluidically connecting cell vents 26 and 27 to one another, which is formed by a transverse bore hole in the storage battery cap 25. Between the storage battery cap 25 and the plug body 1 of the plug system, in the area near section 5 of the plug body 1, there is a circular space 29 surrounding the plug body 1, which provides a fluidic connection with the inside of the cells 30 via the vent 6 in the plug body 1, which is normally interrupted by the valve element 3. The space 29 is closed gas-tight by the sealing elements 11 and 12 molded on the plug body 1 in the area near the storage battery cap 25.

In one area where section 8 of the plug body 1 lies when in use, the storage battery cap 25 has a projection 31, which snaps into a receptacle 32 in the area near section 8 of the plug body 1 to fasten the plug body 1 in the cell vent.

The storage battery cap 25 has a vent 33 arranged laterally in it which is fluidically connected to the channel running basically perpendicular to the direction in which the plug is inserted. The lateral vent 33 is thus used for central degassing. A pot-shaped insert 34 is inserted into the vent 33, which has a central channel 35 running perpendicular to the direction in which the plug is inserted, which creates a fluidic connection between the channel 28 and the atmosphere surrounding the storage battery. Basically perpendicular to the way the channel 35 runs, a filter disk 23 is inserted in the insert 34 so that it borders the channel 28 or the space 29. This prevents flames from being able to get into the storage battery in the event of backfires. Particles of fluid in the gas are also retained by the filter disk 23. As shown in FIG. 3, the insert 34 in the area near the filter disk 23 on the outside is designed to be slightly conical. The insert 34 is pressed into the vent 33 and thus creates a gas-tight connection between the storage battery cap 25 and the insert 34. As seen in FIG. 3, the insert 34 in the area near the filter disk 23 on the outside is designed to be slightly conical so that it can be inserted easily into the vent 33. Of course, the insert 34 can also be glued, welded, screwed or otherwise attached in the vent 33.

Instead of the vent 33 arranged laterally with the pot-shaped insert 34 for lateral degassing, the plug system shown in FIGS. 1a and 1b, as well as 2a and 2b, can be combined. Thus, for example, central degassing can be set up with the plug system in FIGS. 1a and 1b and a plug system as in FIGS. 2a and 2b can be used as a degassing site. Of course, other combinations can be used for various degassing variants. And a plug body 1 with plugs 2 and valve element 3 corresponding to the plug system can also be used. For this, of course, the vent 33 must be designed to correspond to the cell vents.

With the plug system shown in FIG. 3, in connection with the storage battery cap 25, the versatility of the plug system with backfire-safe degassing is clear. The plug system and the insert 34 are the same size, and the insert 34 is, as explained already, also formed by the plug system.

Figure 4:
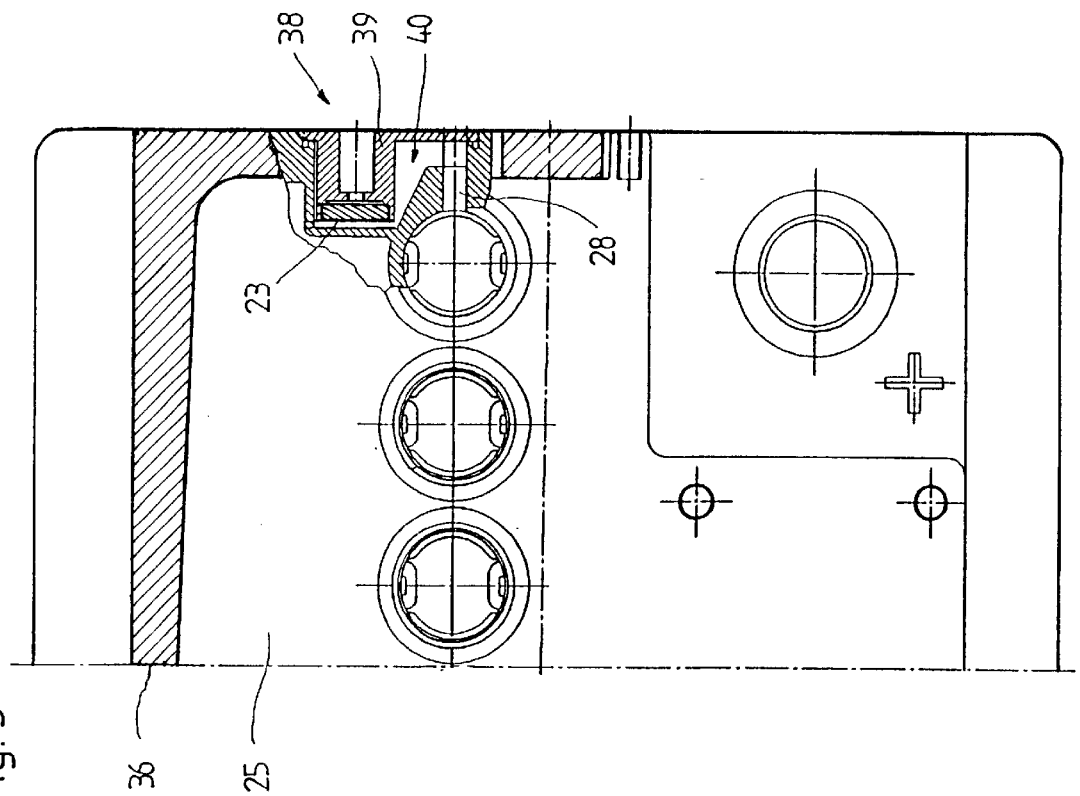
FIG. 4 shows a top view, partially sectioned, of a storage battery with an example of embodiment of a plug system in the invention similar to FIGS. 1a, 1b and 3.

FIGS. 4 and 5 show other examples of embodiment for lateral degassing with the plug system in the invention. FIG. 4 shows a partially sectioned top view of a cutout of a storage battery cap 25, on which a pivoting supporting element 36 is arranged. As can be seen in the sectioned area, the channel 28 connecting the cell vents fluidically with one another is capped laterally with a blind plug 37. Above the blind plug 37, the battery cap 25 has a vent 33 arranged laterally into which an insert 34 with a filter disk 23 corresponding to FIG. 3 is inserted. The channel 35 of the insert 34 here is fluidically connected to the space 29 formed by the plug body 1 and the battery cap via the filter disk 23.

In the example of embodiment in FIG. 5, a degassing channel 40 is provided that is connected to channel 28 laterally and runs basically parallel to it in the storage battery cap 25 through a vent 38 and an insert 39 which tapers conically and extends through a filter disk 23 then expanding laterally from the storage battery cap 25 outward and thus provides a fluidic connection between the inside of the cells and the atmosphere surrounding the storage battery.

Improved backfire protection and an improved seal are provided by the arrangements in FIGS. 4 and 5, since the gas is subject to multiple changes in direction and since the filter disk 23 is arranged so that flames outside cannot penetrate the inside of the storage battery and a defined explosion can ultimately take place outside the inside of the cell.

The arrangements in FIGS. 4 and 5 are used on smaller storage battery caps 25. On smaller storage battery caps corresponding to FIGS. 4 and 5, the insert 34 cannot be arranged as in the embodiment in FIG. 3 for space reasons. In FIG. 4, there is backfire-safe degassing via the space 29 in the outer cell formed by the reduced section 5 of the plug body 1. In FIG. 5, there is backfire-safe degassing of the last cell via the central degassing channel 28, which extends into degassing channel 40.

Figure 6:
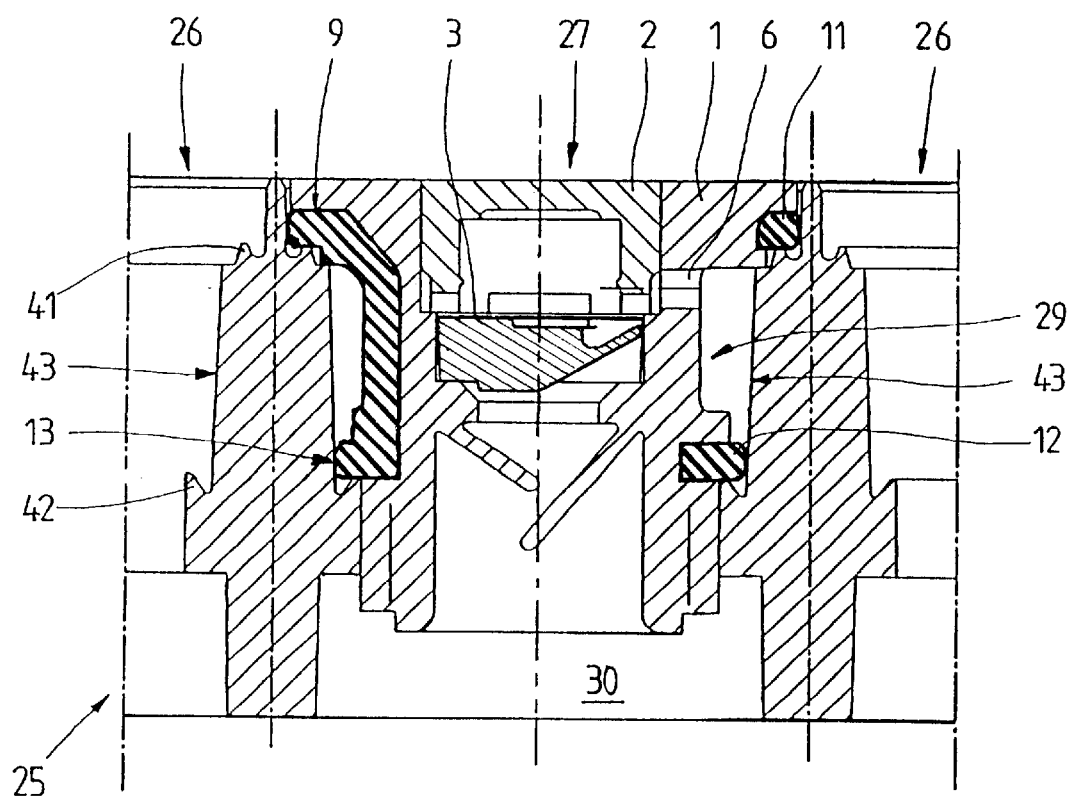
FIG. 6 shows a sectioned view of another example of embodiment of the plug system in the invention with another design of the sealing element.

FIG. 6 also shows a sectional view of a cutout of a storage battery cover 25 with open cell vents 26, partially shown, and a cell vent 27 closed with a plug system similar to the one in FIGS. 1a and 1b. Between the storage battery cap 25 and the plug body 1 of the plug system, in the area of section 5 of the plug body 1, there is also a space 29 surrounding the plug body 1 like a ring, which provides a fluidic connection with the inside of the cell 30 via the vent 6 in the plug body 1 that is normally interrupted by the valve element 3.

To safely seal the two sealing planes in the area of the stop surfaces 9 and 13 both radially and axially, the storage battery cap 25 has caps 41 and 42 in the corresponding areas of the cell vents which press into the respective sealing elements 11 and 12. As can be seen from FIG. 6, the storage battery cap 25 has a leading slope or insert slope 43 extending along the space 29, which makes for better tolerance equalization and makes it simpler to insert the plug body 1 into the cell vent 27. As seen also in FIG. 6, the sealing element almost completely adjoins the plug body 1 along the space.

What is claimed is:

1. A plug system for capping at least one cell vent of a storage battery, comprising:
    a plug body which is adapted to be inserted tightly into said cell vent;
    a plug disposed within said plug body;
    a valve element disposed below said plug within said plug body; and
    at least one plug vent formed in at least one of said plug body and said plug,
    wherein said plug system provides a normally closed fluidic connection between an inside of a cell and an atmosphere surrounding said storage battery,
    wherein said plug and said valve element are adapted to be inserted into said plug body after said plug body has been inserted into said cell vent, and
    wherein the insertion of said plug body into said cell vent causes a closing of at least one of said plug vents.

2. The plug system of claim 1, wherein said plug body has at least one sealing element.

3. The plug system of claim 2, wherein said sealing element is fixed onto said plug body.

4. The plug system of claim 2, wherein said sealing element comprises:
    an O-ring.

5. The plug system of claim 1, wherein said plug body includes:
    an outer section having a first diameter; and
    at least one reduced section having a second diameter, said second diameter being less than said first diameter.

6. The plug system of claim 5, wherein said plug body has at least one vent in a lateral surface of said at least one reduced section.

7. The plug system of claim 1, wherein said plug body further includes:
    a first section and a second section, wherein said first and second sections are disposed on either side of said at least one reduced section; and
    a first and a second sealing element, wherein said first sealing element is disposed within said first section and said second sealing element is disposed within said second section.

8. The plug system of claim 7, wherein said plug body further includes at least one intermediate wall disposed within said plug body, said intermediate wall forming a baffle.

9. The plug system of claim 8, wherein said intermediate wall is disposed within said second section adjacent said valve element.

10. The plug system of claim 1, wherein said plug body includes an inner section disposed within said plug body, said inner section for holding said valve element.

11. The plug system of claim 10, wherein said inner section is disposed proximate at least one vent disposed within a lateral surface of said plug body.

12. The plug system of claim 1, wherein said plug body is adapted to be attached in said at lease one cell vent of said storage battery.

13. The plug system of claim 1, wherein said plug body includes an attachment element.

14. The plug system of claim 1, wherein said plug body includes a projection for attachment into said at least one cell vent.

15. The plug system of claim 1, wherein said plug is adapted to be inserted tightly into said plug body by pressing or screw threading.

16. The plug system of claim 1, wherein said plug is adapted to be inserted tightly into said plug body.

17. The plug system of claim 1, wherein said plug is adapted to hold a filter disk.

18. The plug system of claim 17, wherein said filter disk is adapted to be attached to said plug.

19. The plug system of claim 17, wherein said plug includes at least one projection for attaching said filter disk.

20. The plug system of claim 1, wherein said plug is adapted to be attached to said plug body.

21. The plug system of claim 1, wherein said plug being insertable into said plug body has alternatively a centric degasifying or a degasifying realized by said plug.

22. The plug system of claim 1, wherein said vent is arranged eccentrically.

23. The plug system of claim 22, wherein said plug is adapted to be inserted in the plug body capping said vent.

24. A storage battery cap for use in a plug system for capping at least one cell vent of a storage battery, comprising:
an insert adapted to be inserted into said storage battery cap, said insert providing a fluidic connection between an interior of a cell and an atmosphere surrounding said storage battery allowing front degassing; and
wherein said plug system comprises:
a plug body which is adapted to be inserted into said cell vent;
a plug disposed within said plug body;
a valve element disposed below said plug within said plug body; and
at least one plug vent formed in at least one of said plug body and plug,
wherein said plug system provides a normally closed fluidic connection between an inside of a cell and an atmosphere surrounding said storage battery,
wherein said plug and said valve element are adapted to be inserted into said plug body after said plug body has been inserted into said cell vent, and
wherein insertion of the plug body into said cell vent causes a closing of at least one of said plug vents.

25. The storage battery cap of claim 24, wherein said insert forms a funnel-shaped channel.

26. The storage battery cap of claim 25, wherein said insert has at least one receptacle for a filter element.

27. The storage battery cap of claim 26, wherein said filter element is adapted to be arranged adjacent a space formed by said plug body and said storage battery cap.

28. The storage battery cap of claim 24, wherein said insert is adapted to be tightly insertable into said storage battery cap.

29. The storage battery cap of claim 24, wherein said storage battery cap further includes cam-like projections disposed proximate said at least one cell vent, whereby allowing axial sealing of said at least one cell vent.

* * * * *